US012141782B2

(12) United States Patent
Dabney

(10) Patent No.: US 12,141,782 B2
(45) Date of Patent: *Nov. 12, 2024

(54) SYSTEMS AND METHODS FOR PROCESSING ENCODED SYMBOLS TO FACILITATE SECURED COMMUNICATION BETWEEN DATABASE SYSTEMS OF TWO ENTITIES AND TO UPDATE DATABASE TUPLES ASSOCIATED WITH THE DATABASE SYSTEMS

(71) Applicant: Vaughn Dabney, Sherman Oaks, CA (US)

(72) Inventor: Vaughn Dabney, Sherman Oaks, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/505,044

(22) Filed: Nov. 8, 2023

(65) Prior Publication Data
US 2024/0070645 A1   Feb. 29, 2024

Related U.S. Application Data

(63) Continuation of application No. 16/749,750, filed on Jan. 22, 2020, now Pat. No. 11,853,995.

(60) Provisional application No. 62/795,225, filed on Jan. 22, 2019.

(51) Int. Cl.
*G06Q 20/32* (2012.01)
*G06Q 20/36* (2012.01)
*G06Q 20/38* (2012.01)

(52) U.S. Cl.
CPC ..... *G06Q 20/3274* (2013.01); *G06Q 20/3224* (2013.01); *G06Q 20/3276* (2013.01); *G06Q 20/3674* (2013.01); *G06Q 20/38215* (2013.01)

(58) Field of Classification Search
CPC .......... G06Q 20/3274; G06Q 20/3224; G06Q 20/3276; G06Q 20/3674; G06Q 20/38215
USPC ....................................................... 705/73
See application file for complete search history.

(56) References Cited

U.S. PATENT DOCUMENTS

| | | | |
|---|---|---|---|
| 6,868,391 B1 * | 3/2005 | Hultgren | G06Q 20/02 705/16 |
| 9,715,689 B1 * | 7/2017 | Ellis | G06Q 20/20 |
| 9,846,878 B2 * | 12/2017 | Kumnick | G06Q 20/4016 |
| 10,586,227 B2 * | 3/2020 | Makhdumi | G06Q 20/3276 |
| 10,713,630 B2 * | 7/2020 | Goldstone | G06Q 20/3276 |
| 10,963,868 B1 * | 3/2021 | McCauley | G06Q 20/02 |

(Continued)

FOREIGN PATENT DOCUMENTS

| WO | WO-2016134016 A1 * | 8/2016 | ......... G06Q 20/3224 |
|---|---|---|---|
| WO | 2017012542 | 1/2017 | |

OTHER PUBLICATIONS

Helland "Identity by Any Other Name", Communications of the ACM, Apr. 2019, pp. 80-87) (Year: 2019).*

(Continued)

*Primary Examiner* — James D Nigh

(57) ABSTRACT

Systems and methods for processing encoded symbols to facilitate secured communication between a mobile device and one or more database systems is provided. Communication between the mobile device and the database systems is performed to update database tuples in the database systems based on processing of the encoded symbols. The encoded symbols may correspond to QR codes and updating database systems may include administering quick response (QR) code-enabled payment transactions.

21 Claims, 10 Drawing Sheets

(56) References Cited

U.S. PATENT DOCUMENTS

| | | | |
|---|---|---|---|
| 2012/0203665 A1* | 8/2012 | Morgan | G06Q 20/401 |
| | | | 705/44 |
| 2015/0046338 A1* | 2/2015 | Laxminarayanan | |
| | | | G06Q 20/38215 |
| | | | 705/67 |
| 2016/0155112 A1* | 6/2016 | Phillips | G06Q 20/3276 |
| | | | 235/379 |
| 2016/0224972 A1* | 8/2016 | Li | G06Q 20/3223 |
| 2018/0018660 A1* | 1/2018 | Gomes | H04L 63/102 |
| 2019/0034921 A1* | 1/2019 | Hammad | G06Q 20/384 |
| 2019/0087815 A1* | 3/2019 | Goldschmidt | G06Q 20/3674 |
| 2019/0087816 A1* | 3/2019 | Jamkhedkar | G06Q 20/3674 |

OTHER PUBLICATIONS

Jiao, WO 2017/012542 A1 Published On Jan. 26, 2017. Application PCT/CN2016/090634 Filed On Jul. 20, 2016. English Translation via IP.com. (Year: 2017).

Tao-Ku Chang, "A Secure Operational Model for Mobile Payments", The Scientific World Journal, 1-14, 6, Fig. 4, vol. 2014, Article ID 626243, 14 pages, 2014. https://doi .org/10.1155/2014/626243 (Year: 2014).

* cited by examiner

SYSTEMS AND METHODS FOR PROCESSING ENCODED SYMBOLS TO FACILITATE SECURED COMMUNICATION BETWEEN DATABASE SYSTEMS OF TWO ENTITIES AND TO UPDATE DATABASE TUPLES ASSOCIATED WITH THE DATABASE SYSTEMS

CLAIM OF PRIORITY

This application claims priority to U.S. patent application Ser. No. 16/749,750, now allowed, which claims priority to U.S. Provisional Patent Application No. 62/795,225, filed on Jan. 22, 2019. Both applications are incorporated by reference in their entirety.

TECHNICAL FIELD

The present disclosure relates generally to systems and methods for processing encoded symbols to facilitate secured communication between a mobile device and one or more database systems. Further, communication between the mobile device and the database systems is performed to update database tuples in the database systems based on processing of the encoded symbols. For example, the encoded symbols may correspond to QR codes and updating database systems may include administering quick response (QR) code-enabled payment transactions.

BACKGROUND

Traditional methods of transferring money (e.g., cash, check, or credit card) are quickly becoming outdated. Carrying large sums of cash is often impractical and presents safety and security concerns. Consumers and merchants are also increasingly carrying less cash, necessitating alternative methods of payment. While checks eliminate some of the impracticalities of cash, writing checks is time-consuming, inconvenient, and lacking in adequate security safeguards. Similarly, electronic funds transfers (e.g., wire transfer or ACH) are useful for sending large sums of money, but require considerable time (often several days) to process, and are thus not practical for everyday transactions.

While credit and debit cards are an effective and common alternative (particularly in view of promotions and rewards programs offered by credit card companies and banks), consumers are becoming more conscious about how and where they use and store their credit card information. Additionally, online retailers generally require customers to save financial data on their platforms, leaving the data vulnerable in the event of breach of the retailer's (or other recipient's) database. This presents a security risk, as the data is sent to and from the user's device (usually a smartphone, tablet, or computer). And while various alternative payment platforms are available on smartphones (like Apple Pay and other forms of NFC payment), payments on these platforms can also be compromised because the merchant is typically given access to the payee's personal or financial data.

Accordingly, there is a need in the art for an improved system and method that addresses the above security and practicality concerns of existing payment options.

QR codes, commonly used in consumer advertising, can be used to store bank, credit card, or other personal information pertaining to a buyer or seller (or any other entity) for sending or receiving money. The present inventions leverage QR codes to facilitate funds transfers between one or more users in a way that ensures greater security of the participants' personal and/or financial information. Contrary to existing uses of QR codes, the merchant's QR code—not the consumer's code—is scanned, ensuring that the consumer's personal and financial data is more secure.

In addition, the present inventions utilize cryptographic processes and algorithms to enable the secure handling of financial and personal data among entities. Cryptography involves the design and analysis of mathematical techniques that can enable secure communications in the presence of malicious adversaries. Herein, cryptographic processes and algorithms are used to prevent unwanted entities from accessing item-level data stored in a central repository. In some implementations, symmetrical encryption can involve communicating entities to agree on secret and authentic keying material for use in encrypting and decrypting data exchanged between the communicating entities.

Additionally, the present inventions utilize multiple servers or databases to further provide the users with a higher level of autonomy and security than existing payment systems. For example, a first server or database may receive an account ID (e.g., decoded from a QR code) for an intended recipient of funds, a specified quantity of funds for transfer, and a sender ID (e.g., for an entity desiring to transfer funds to the intended recipient) from a user's mobile device. Upon verifying the account ID to ensure there is a valid registered account, the first server or database may transfer the sender ID and specified funds for transfer to a second server or database for carrying out the financial transaction. In this scenario, the first server or database does not receive or transmit any actual funds, nor does it receive or transmit the account information of the sender. Thus, the sender can be assured that his or her account information will not be shared or compromised (and avoid security concerns posed by transferring the funds via credit card or by allowing the intended recipient to scan his/her QR code). In other words, the present invention provides the users with a higher level of autonomy and security than existing payment systems.

SUMMARY OF THE INVENTION

According to one aspect of the invention, a mobile device may include a display, a memory, a camera, a processor, an encryptor, a transmitter, and a GPS receiver. The memory may store a customer ID associated with a user of the mobile device, a code associated with financial information of a recipient entity, and an account ID associated with a financial account of the recipient entity. The account ID may be derived from the code. The camera may include an image sensor for capturing image data, which may include information corresponding to the code.

The processor may be configured to receive the image data after the camera captures the image data, process the image data to detect whether the image data includes the information corresponding to the code, obtain the code when the processor detects that the image data includes the information corresponding to the code, derive the account ID from the code, and generate a prompt. The prompt may be shown on the display and may specify a quantity of funds for transfer to the recipient entity. The mobile device may include an input device that receives a user input in response to the prompt. The processor may be configured to generate a message, which may include the account ID, when the user input is received. The mobile device may also include an encryptor that encrypts the message.

The mobile device may also include a transmitter that is operable to transmit the encrypted message to a server for initiating a payment processing transaction. The payment processing transaction may include transferring the specified quantity of funds from the user of the mobile device to the recipient entity. The information included in the message may be used to update a first database associated with the user and a second database associated with the recipient entity. The mobile device may further include a GPS receiver to facilitate identification of at least one additional entity within a payment processing network by the processor. The user of the mobile device may be a member of the payment processing network. The code may include a QR code, and the input device may include a touchscreen. The processor may be further configured to display a guide to facilitate capture of the image data. The image data may correspond to a decodable image of the QR code. The mobile device may also include a receiver for receiving an electronic transmission of the code. The processor may be further configured to generate a prompt for specifying a quantity of digital currency for transfer to the recipient entity.

As another aspect of the invention, a payment processing method may include storing in a memory of a first mobile device a customer ID associated with a user of the first mobile device; receiving at the mobile device a code associated with a financial account of a recipient entity; storing the code in the memory; displaying a prompt on the first mobile device for specifying a quantity of funds for transfer to the recipient entity; receiving a user input in response to the prompt; generating a message when the user input is received, where the message includes the account ID; encrypting the message; transmitting the encrypted message to a payment processing server for initiating a payment processing transaction, where the payment processing transaction includes transfer of the specified quantity of funds from the user of the first mobile device to the recipient entity, and information included in the message is used to update a first database associated with the user and a second database associated with the recipient entity; and identifying, using at least a GPS receiver, at least one additional entity within a payment processing network, where the user of the first mobile device is a member of the payment processing network.

Additionally, the code may include a QR code, and the method may further include capturing an image of the QR code from a second mobile device, using a camera that includes an image sensor of the first mobile device. The method may further include displaying a guide for capturing the QR code using the camera of the first mobile device. The code may be transmitted to the first mobile device by a second mobile device. The code may also be embedded within a physical object. The recipient entity and user of the first mobile device may be members of a payment processing network. The displaying a prompt may include requesting the user to specify a quantity of digital currency. The customer ID may be associated with a financial account of the user of the first mobile device. The payment processing transaction may include a donation. The prompt may include one or more selectable predetermined quantity options, and/or it may include a text field for entering a quantity of funds.

As another aspect of the invention, a payment processing method may include receiving, at a first server, a first encrypted message. The first encrypted message may be generated based on image data that is decoded to retrieve a code. The method may further include decrypting the first encrypted message to retrieve an account ID, a customer ID, and information specifying a quantity of funds. The method may further include storing at the first server: a plurality of account IDs, where each one of the plurality of account IDs is associated with a financial account; the retrieved account ID, where the retrieved account ID is associated with a financial account of a recipient entity and is derived from a code associated with the recipient entity; the customer ID, where the customer ID is associated with a user of a first mobile device, and the quantity of funds, where the quantity of funds is specified for transfer to the recipient entity; verifying, at the first server, the retrieved account ID by comparing the retrieved account ID with the stored plurality of account IDs to identify a match; generating a second message, after verifying the retrieved account ID, the second message including the customer ID and the quantity of funds specified for transfer; encrypting the second message to obtain a second encrypted message, where information included in the second message is used to update a first database associated with the user and a second database associated with the recipient entity; and transmitting the second encrypted message to a second server for executing a payment processing transaction, the payment processing transaction including transfer of the specified quantity of funds from a financial account of the user of the first mobile device to the recipient entity.

The method may further include receiving at the first server a transaction ID generated by the second server, where the transaction ID identifies at least a portion of the payment processing transaction. In one aspect of the method, the first server does not transfer the specified quantity of funds from a financial account of the user of the first mobile device to the recipient entity. Additionally or alternatively, the first server does not store financial account information relating to the user of the first mobile device.

BRIEF DESCRIPTION OF THE DRAWINGS

Embodiments of the invention will now be described, by way of example only, with reference to the accompanying drawings in which.

DETAILED DESCRIPTION

The following detailed description refers to the accompanying illustrations. Wherever possible, the same reference numbers are used in the illustrations and the following description to refer to the same or similar parts. While several illustrative embodiments are described herein, modifications, adaptations and other implementations are possible. For example, substitutions, additions or modifications may be made to the components illustrated, and the exemplary methods described herein may be modified by substituting, reordering, removing, or adding steps to the disclosed methods. Accordingly, the following detailed description is not limiting of the disclosed embodiments.

Figure 1:
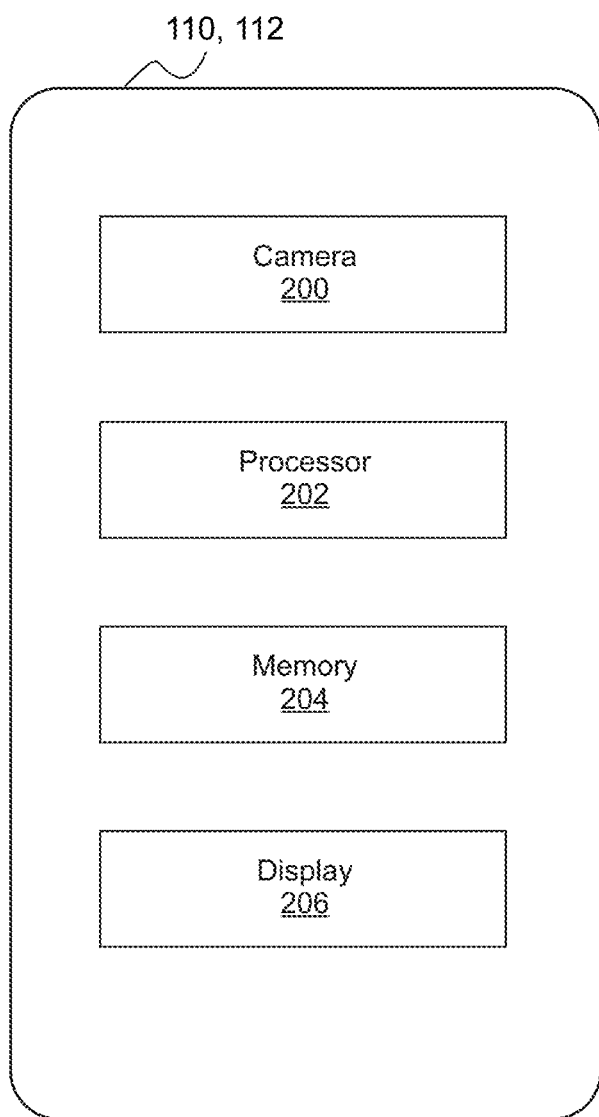
FIG. 1 is an exemplary embodiment of mobile devices 110 and 112.

According to one embodiment, an electronic computing device (e.g., a mobile device, such as a mobile phone, tablet, or computer) may be used to scan and/or receive a QR code for purposes of transferring funds to another individual, company, or entity (including government entities). By way of non-limiting example, FIG. 1 is a diagram of the components of exemplary mobile devices 110 and 112. Mobile device 110 is a sending mobile device that is configured to transfer funds to the user of mobile device 112, a recipient mobile device. Both devices may be operable and configured to present and scan a QR code for purposes of transferring money. As shown in FIG. 1, each of mobile devices 110 and 112 may include a camera 200, a processor 202, a memory 204, and a display 206. Each of mobile devices 110 and 112 may incorporate hardware and/or software functionality consistent with today's smartphones and tablets.

Camera 200 may include camera hardware and/or software that can be implemented within a mobile device. Camera 200 may include a camera module that includes one or more image sensors for converting optical images into electrical signals, and an image signal processor configured to conduct demosaicing, autofocus, exposure, white balance, color correction, noise reduction, and/or filtering. In some embodiments, more than one camera may be included in the mobile device (e.g., front and rear facing cameras on a smartphone). Elements and operations of camera 200 may be software-based and/or hardware-based.

Processor 202 may include a single core or multiple core processor system that provides the ability to perform parallel processes simultaneously. For example, processor 202 may include a single core processor that is configured with virtual processing technologies known to those skilled in the art. In certain embodiments, processor 202 may use logical processors to simultaneously execute and control multiple processes. Processor 202 may implement virtual machine technologies, or other similar known technologies to provide the ability to execute, control, run, manipulate, and/or store multiple software processes, applications, or programs. In another embodiment, processor 202 may include a multiple-core processor arrangement (e.g., dual or quad core) that is configured to provide parallel processing functionalities to allow mobile devices 110 and 112 to execute multiple processes simultaneously. One of ordinary skill in the art would understand that other types of processor arrangements could be implemented to provide the capabilities disclosed herein.

Memory 204 may include one or more memory devices that store data including, but not limited to, random access memory (RAM), read-only memory (ROM), a magnetic storage device (e.g., a hard disk), an optical storage medium (e.g., a CD- or DVD-ROM), a high-definition optical storage medium, an electronic storage device (e.g., EPROM or a flash drive), and/or any other suitable data storage device. Memory 204 may include a tangible and non-transitory computer-readable medium having stored therein computer programs, sets of instructions, code, or data to be executed by processor 202.

Memory 204 may store a QR code, information obtained after decoding same, and a quantity of money or sum of funds to be transferred to a financial account. Memory 204 may also store an operating system, and may include browser applications capable of rendering standard Internet content, such as Microsoft Internet Explorer, Google Chrome, Apple Safari, and/or Mozilla Firefox. Memory 204 may also include one or more applications, such as a payment processing program, a messaging program, and/or other programs capable of generating documents or other electronic content or for interfacing with one or more other devices, systems, or networks. Application programs may be implemented using applets, plug-ins, modules, widgets, and/or any other software components.

Display 206 may include a display screen appropriate for a mobile device. For example, display 206 may include a high-definition (HD) liquid-crystal display (LCD), OLED, and/or liquid retina display screen. Furthermore, display 206 may include a touch sensitive display. For example, display 206 may include a capacitive touchscreen responsive to touch gestures, such as taps, swipes, and the like.

Figure 2:
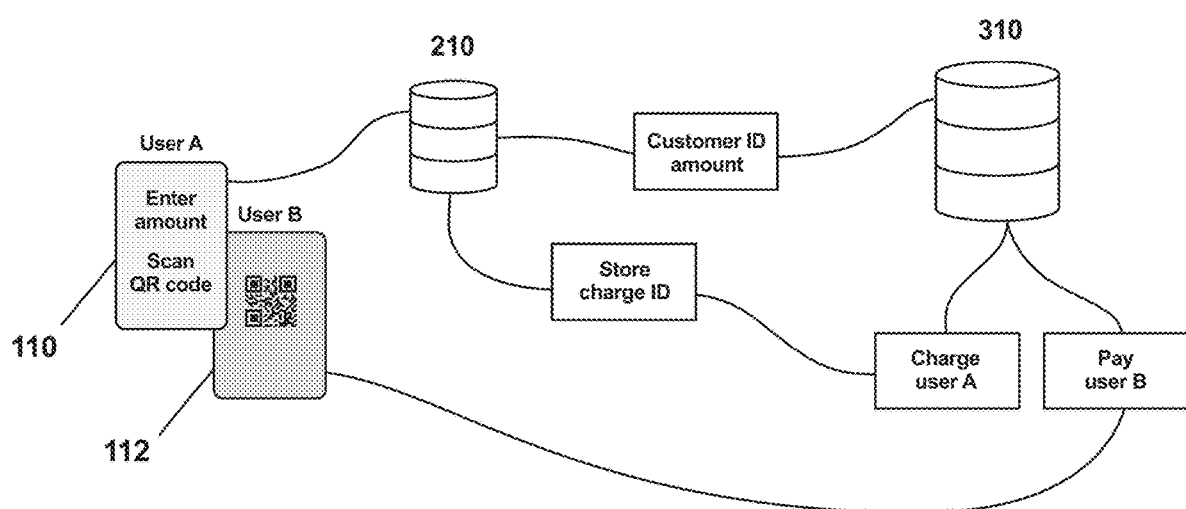
FIG. 2 is an exemplary embodiment of an electronic payment processing system.
Figure 4:
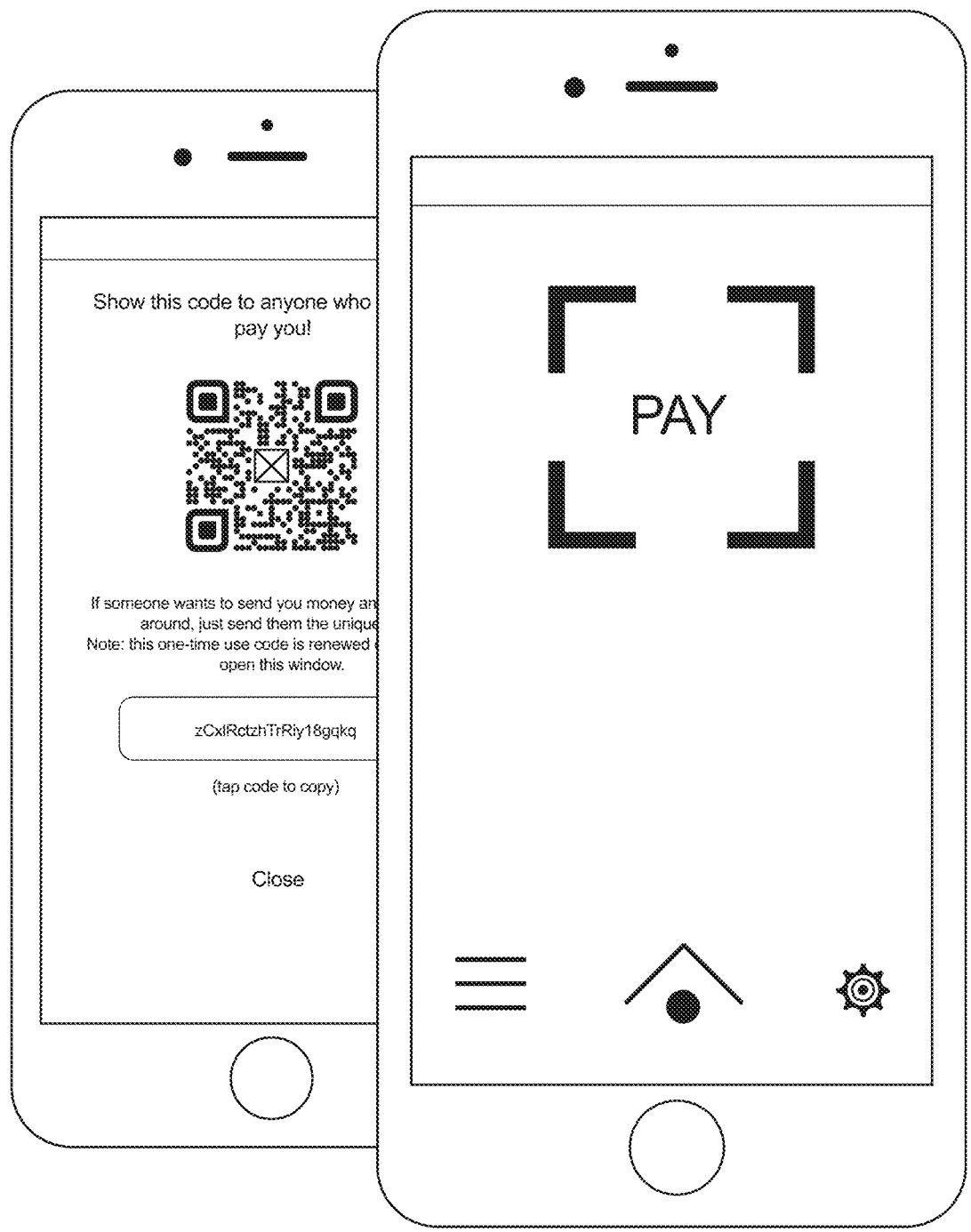
FIG. 4 is an exemplary embodiment of an electronic payment processing application, depicting a process for obtaining an image of a QR code.

With reference to FIG. 2, a user (User A) of a sender mobile device 110, who desires to transfer money to a user (User B) of a recipient mobile device 112, may do so by scanning (e.g., using camera 200) a QR code displayed on the screen of a recipient mobile device 112. The QR code may include or relate to financial account information regarding User B. Per FIG. 4, the QR code may be scanned using a payment processing application stored on the mobile device 110, which may display an area (e.g., an outline or a box) into which User A may attempt to capture the QR code using the mobile device's camera. Mobile devices 110 and/or 112 may include an illumination sensor and/or illumination detector that may detect that sufficient light is not available to scan the QR code and in response to this detection may generate a notification informing the user to turn on the flash. For example, the illumination sensor may detect that the luminance value of the image signal being input in the preview window and/or the ambient light is below a threshold value and when this occurs, the device may display a notification prompting the user to enable the flash or upon such a detection the mobile device may automatically enable the flash.

In addition, the sender mobile device 110 and/or recipient mobile device 112 may include an infrared camera that is capable of scanning QR codes successfully even in low light conditions. Mobile devices 110 and/or 112 may automatically enable the infrared cameras upon detection of illumination conditions being lower than a predetermined threshold such that the process would not be noticeable to the user or the devices may provide the user with an option where the user may be prompted to use the infrared camera in view of the low light conditions.

Once the QR code has been captured, the sending mobile device 110 may transmit information to the payment management system indicating that it has read the QR code. In response, the payment management system may initiate a transfer of funds from a financial account associated with User A of the sender mobile device 110 to a financial account associated with User B of recipient mobile device 112. The financial account may include, for example, a bank account, credit card account, or an account administered by a third-party payment processing provider.

Figure 6:
FIG. 6 is an exemplary embodiment of an electronic payment processing application, depicting a process for specifying a quantity of funds for transfer.

The payment management system may include one or more databases or servers (or combination of same) that store information related to User A or B. For example, the database or server (or combination of same) may be configured to verify that User B is a valid vendor and/or that User B has a valid financial account into which the transferred funds may be deposited or credited. For example, upon scanning a QR code displayed on recipient mobile device 112, sending mobile device 110 may decode the QR code to obtain an account ID associated with a financial account of User B. Sending mobile device 110 may be configured with software that allows the user to specify a quantity of funds (e.g., via a text box and confirm payment button, as shown in FIG. 6, or a screen with selectable options) to be transferred to User B. The mobile device 110 may then transmit (e.g., via a cellular or WiFi connection) the decoded account ID for User B, the specified quantity of funds, and the customer or sender ID associated with User A to database 210 (which may itself include one or more servers, databases, or computers). Database 210 may be configured to verify the account ID of User B (e.g., by comparing the transmitted account ID with a database of account IDs) to ensure that there is a valid registered account in the payment management system and/or to ensure that there is an identifiable account into which to deposit or credit the specified funds for transfer. Upon verification, the sender or customer ID may be transmitted (e.g., via a cellular, WiFi, or hard wired connection) from database 210 to database 310 (which may also include one or more servers, databases, or computers) along with the specified funds for transfer.

Database 310 may be configured to carry out the transaction initiated by User A. Specifically, database 310 may be configured to charge a financial account of User A for the specified funds, and to pay or credit a financial account of User B (associated with the account ID) with same. Database 310 may generate a transaction (or charge) ID which may then be transmitted to database 210. The transaction ID may identify the transaction which has just occurred between Users A and B, and may be used, for example, for recalling or reversing the transaction or to request a refund. In this scenario, database 210 does not receive or transmit any actual funds, nor does it receive or transmit the account information (e.g., bank or credit card account information) of User A. Thus, using the aforementioned system and method, User A can be assured that his or her account information will not be shared or compromised (and avoiding security concerns posed by transferring the funds via credit card or by allowing User B to scan his/her QR code). In other words, the present invention provides User A with a higher level of autonomy and security than existing payment systems.

Security requirements for database 310 can prevent a party observing the database from information stored in the database and/or transactions effectuated through the database. For example, the security requirements can prevent an attacker from determining any information with regard to the data stored in database 310. In addition, the entity that owns the data (the data owner) can enforce various levels of access control to the item-level data for its items. For example, regarding payment information, the data owner can provide access control to this information based on their level of trust with the other entity, including denying the transaction when the other entity does not receive a predetermined trust level.

In some implementations, in a first access level (A1), a data owner can provide individual access to an entity for each tuple of item-level data stored in database 310. The first level of data access control allows the data owner to set the access level to each individual tuple of the item-level data.

In some implementations, in a second access level (A2), a data owner can provide an entity access to all tuples of item-level data for an item that the entity at one time possessed. For example, a data owner can use the second level (A2) of access control for item-level tracking. The data owner can allow or restrict the visibility of items on an item-by-item basis to other entities that at one time may have had possession of the item in previous financial transactions between the same entities. This can allow one entity (e.g., the data owner) to provide item-level data access to other entities without having to set individually the access control of each tuple of the item-level data to each individual entity. For example, entities, including the data owner, may then engage in fair data sharing agreements for an item with one another without the risk of disclosing sensitive or confidential information, either directly or by inference, regarding each individual item or entity.

In some implementations, in a third access level (A3), a data owner can provide an entity access to all tuples of item-level data previously possessed by the data owner. For example, the data owner can use the third level (A3) of access control to allow trusted third parties (e.g., outsourced manufacturers, service providers or other third parties) full access to all tuples of the item-level data. In the case where the database 310 may be cloud storage, the third access level (A3) may be used between a data owner and the service provider in order for the service provider to manage and maintain the database 310.

Each entity can utilize cryptographic processes and algorithms to enable the secure handling of financial and personal data among entities. Cryptography involves the design and analysis of mathematical techniques that can enable secure communications in the presence of malicious adversaries. The use of cryptographic processes and algorithms by a data owner can prevent unwanted entities from accessing item-level data stored in a central repository. In some implementations, symmetrical encryption can involve communicating entities to agree on secret and authentic keying material for use in encrypting and decrypting data exchanged between the communicating entities. For example, symmetrical encryption can be used for each tuple of data exchanged between the communicating entities. In some implementations, asymmetrical encryption can use a public-key scheme where communicating entities exchange keying material that is authentic but not secret. Each entity selects a single key pair that includes the public key and a related private key kept secret by the entity. A key pair can be associated with each tuple of data exchanged between entities. The use of symmetrical and asymmetrical encryption, as described, assumes a key or key pair for each tuple for each entity. Entities, when sharing data, would exchange a key or key pair for each tuple of data shared. For example, a supply chain may produce millions of items utilizing hundreds of supply chain partners (entities) resulting in the use of a large number of cryptographic keys, as a cryptographic key for each tuple would be exchanged between entities for each entity.

In some implementations, and in order to reduce the number of cryptographic keys while enabling the secure handling of item-level data among entities, a cryptographic scheme can use a random number r as a unique identifier for an item along with two cryptographic keys. Communicating entities can perform a one-time exchange of cryptographic keys where new or additional items or tuples would not need an exchange of new cryptographic keys between the communicating entities. In addition, the encrypted item-level data can be stored in a central repository accessible by both trusted and untrusted entities, but protected from access by any untrusted entities and even the third party service provider.

Tuples (I, D) in a cryptographic scheme can include two values: a unique identifier I, representative of the combination of one item with one entity, and encrypted item-level data D. The unique identifier I for the item can be used to locate and identify the encrypted data D within database 310. For example, the unique identifier I can be used as an index to a data table of encrypted item-level data included in a database or central repository. The unique identifier I can be used to query for the encrypted data D, from the central repository based on the identifier and/or additional information included in the QR code.

Figure 3:
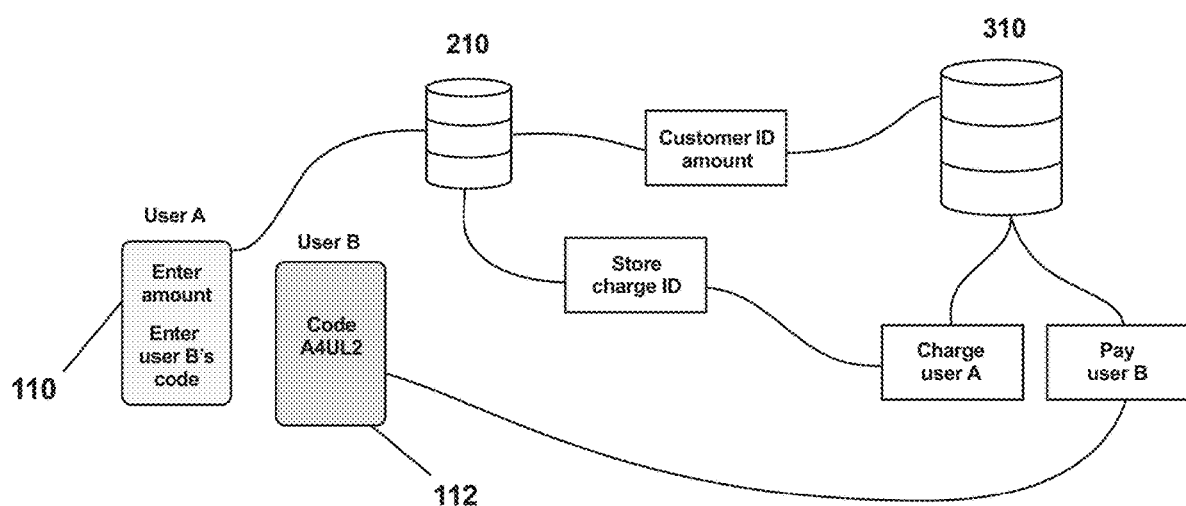
FIG. 3 is an exemplary embodiment of an electronic payment processing system.
Figure 5:
FIG. 5 is an exemplary embodiment of an electronic payment processing application, depicting a process for obtaining an intended recipient's account ID.

FIG. 3 depicts a related embodiment, whereby User A is not located substantially proximate to User B in order to scan User B's QR code. In this scenario, sending mobile device 110 may still obtain and transfer the account ID of User B. For example, recipient mobile device 112 may transmit (e.g., via email, SMS text, or any other messaging application) its QR code directly to User A, which may then be decoded by software on mobile device 110. Similarly, mobile device 112 may transmit a code corresponding to User B's account ID (as shown in FIG. 5), or a link that allows software resident on mobile device 110 to retrieve User B's account ID. Once User B's account ID is obtained, mobile device 110 may then transmit the account ID, along with User A's customer ID, and the quantity of funds specified by User A (as shown in FIG. 6) to database 210. The funds then may be transferred to User B consistent with the system and method disclosed in FIG. 2 as discussed above.

In an alternative embodiment, the QR code may be embedded in a physical object, like a document, a name tag, a t-shirt, or an advertisement (e.g., in a poster, magazine, catalogue, book, or any other promotional materials). Thus, the QR code need not be displayed on a second mobile device, or any other display screen. In this scenario, the sending mobile device 110 still functions as described above. For example, using the sending mobile device 110, the user may scan the QR code in order to transfer funds from his or her financial account to a financial account associated with the QR code. This process may be facilitated by a payment application resident on the sending mobile device 110, which may be configured to scan or read the QR code (e.g., using the rear camera on the mobile device). The software may operate in tandem with one or more cameras on the phone (and/or any other hardware components or software involved in scanning, reading, or decoding the QR code). The software may also allow the user to specify a financial quantity to be transferred and/or an account (e.g., a credit card or bank account) from which to withdraw the funds for transfer. This software may provide a graphical interface for specifying the amount for transfer (e.g., a text box to specify an amount, or a list of selectable options) and/or providing any relevant account information.

The financial account associated with the QR code may pertain to any individual, entity, business, municipality, city, state, country, or non-profit organization, and may be used to process financial transactions in a variety of locations, including in-store, online, at special events (e.g., concerts, festivals, or fundraisers), or in the context of routine financial transactions or reimbursements between individuals. For example, the QR code may be associated with a merchant account (for example, consistent with FIGS. 7 and 8), and the QR code can be associated with a particular product, good, or service. In this scenario, the scanning of the QR code by the sending mobile device 110 can be for purposes of purchasing the associated product, good, or service. The QR code may also allow the user of the sending mobile device to access additional information about the product, good, or service available for purchase (e.g., description information, pricing information, or other promotional information that may impact the user's desire to make a purchase or donation). Additionally, the payment system/platform disclosed herein may be used to transfer any type of currency, including cryptocurrency (e.g., Bitcoin).

The payment software resident on the foregoing mobile devices may also be used to facilitate group payment. For example, in a scenario in which multiple individuals contribute to purchase a good or service, the above payment system may be used to split costs consistent with the desires of the group. By way of example, if Users A and B share a meal at a restaurant and wish to split the bill, they may use the above payment system to facilitate that process. For example, the restaurant may present a bill that contains a QR code. User A may scan the code with his or her mobile device. The mobile device may decode the QR code (using any known methods for decoding), and display the price of the meal, and prompt User A to enter the amount that he or she would like to pay. After doing so, User A may then present the bill with the same QR code to User B, who can scan the code with his or her mobile device, and then specify what he or she would like to contribute. Additional users may also contribute to the tab, so long as they have the requisite software functionality (payment application) on their mobile device.

Figure 7:
FIG. 7 is an exemplary embodiment of an electronic payment processing application, depicting a scenario in which the recipient entity is a merchant.
Figure 8:
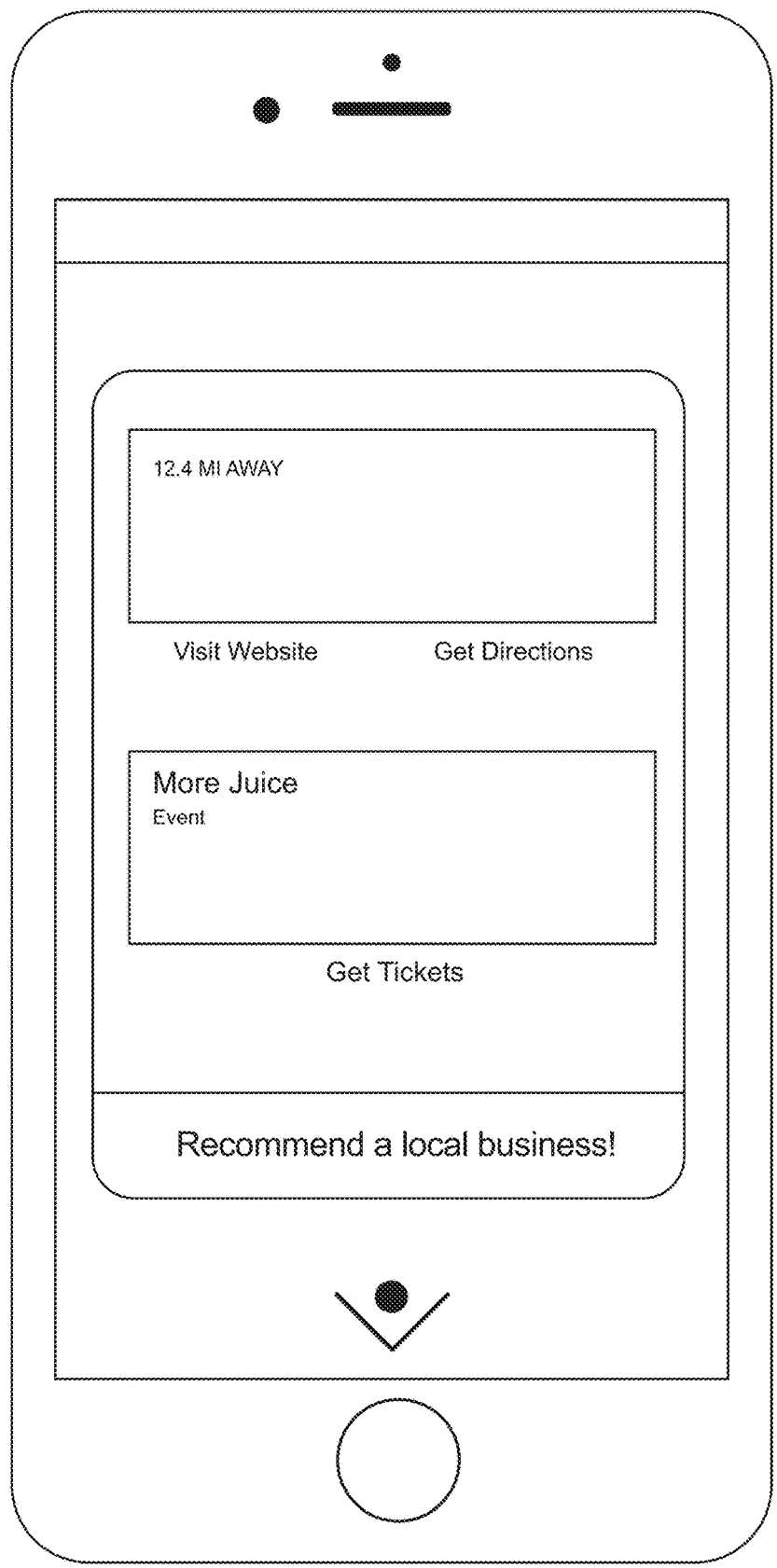
FIG. 8 is an exemplary embodiment of an electronic payment processing application, depicting a scenario in which the recipient entity is a merchant.

The payment application resident on the mobile devices may also provide the geolocation of other entities within the application's ecosystem. For example, mobile device 112 may include a GPS receiver or chipset that operates in tandem with the payment application. Using this GPS functionality (or any other positional functionality, which, for example, may involve use of a compass, gyroscope, or accelerometer), the payment application may identify and/or display the proximity, location, direction, and/or orientation of other entities with whom User A may conduct a financial transaction. The location of these entities may, for example, be presented on a map within the application, and may allow the user to remotely access an entity's QR code remotely through the application itself. As shown in FIGS. 7 and 8, the payment application may also display one or more entities (e.g., local businesses or events) along with each entity's proximity to the user. The payment application may also include messaging functionality to allow the user to communicate with any of the entities regarding a potential transaction. The application may also enable the user to select any of the displayed entities in order to initiate a financial transaction (e.g., upon selecting a button or link corresponding to an entity, the user may be presented with a QR code or another code or link for initiating a financial transaction consistent with the embodiments disclosed herein). The application may also provide a link for each entity that allows the user to obtain additional information about the entity and/or its goods or services. These entities may include, for example, a merchant, business, event host, government entity, non-profit organization, or an individual.

Figure 9:
FIG. 9 is an exemplary embodiment of an electronic payment processing application, in which information regarding the user's transaction history is stored and displayed.
Figure 10:
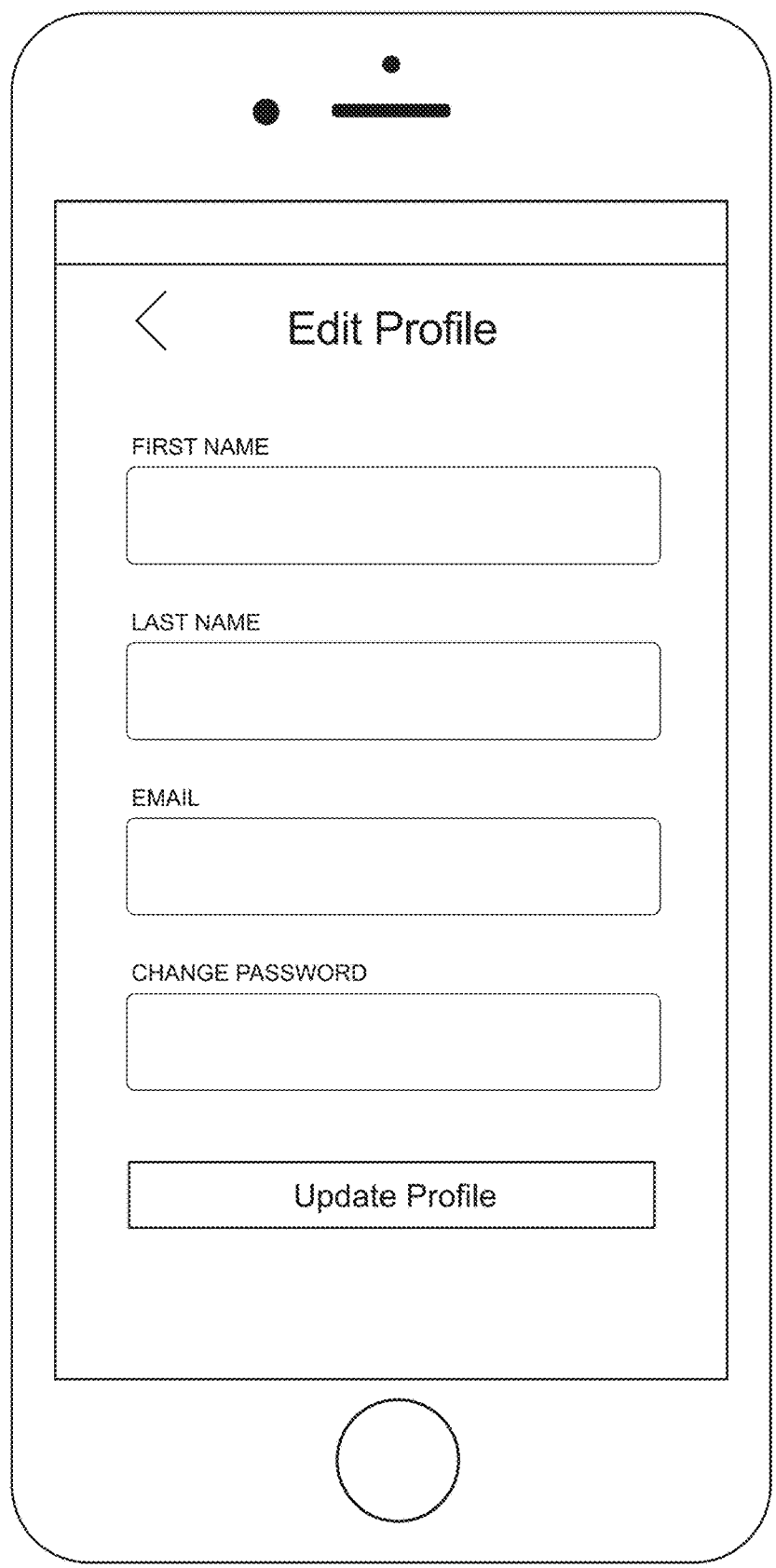
FIG. 10 is an exemplary embodiment of an electronic payment processing application, depicting a process for entering user profile information.

Additionally, as shown in FIG. 9, the payment application may also store information regarding the user's transaction history, which may include, for example, a list of entities with whom the user has transferred (or received) money adjacent or immediately next to the amount of funds transferred (and to whom). The transaction history may be stored and maintained as part of a user profile within the application. The payment application thus also provides an interface for creating and/or editing the profile, and may be configured to request information about the user, including name, email address, home or business address, phone number, and a password, as shown in FIG. 10 (as well as any other contact information).

Alternatively, the QR code may be associated with a non-profit organization, and the code may be presented for purposes of facilitating donations. For example, a user may scan a QR code using a sending mobile device 110 that is displayed or embedded within promotional materials regarding the organization. The software on the mobile device may provide a user interface (e.g., including a text box or similar graphic) through which the user may specify a donation amount. Alternatively, upon scanning the QR code, the software on the mobile device may present the user with one or more selectable donation options.

As another alternative, the QR code may be associated with a person in need (e.g., a homeless person, or someone who is otherwise in need of financial assistance), who is sponsored by or associated with a non-profit organization (e.g., a homeless shelter, soup kitchen, religious institution, or any type of social services organization). A user may scan a QR code associated with this person and/or organization using a sending mobile device 110. The QR code may be embedded within or shown on an item worn or possessed by the person in need (e.g., on an identification card, which may include a photo and/or information regarding the organization, for security purposes). Upon scanning the code, the software on the recipient mobile device may display selectable donation options for the person affiliated with the QR code and/or a text box so that the user may specify an exact amount. Thus, using the payment system/platform disclosed herein, the user may securely donate money to a person in need (and in a manner which may be tracked, for example, for accounting or tax purposes). The software may relay the donated funds to a financial account associated with the individual which is administered or otherwise affiliated with a sponsoring organization. Among many benefits, this embodiment permits the user to donate money to a person in need without the need to carry cash, and to ensure that the funds will be controlled or administered in a reliable manner by a social services organization that operates in the best interests of the sponsored individual.

Similarly, the payment system/platform disclosed herein may be used to facilitate fundraising (for any number of purposes). For example, promotional materials may display a QR code, which a user may scan with his or her mobile device in order to transfer funds to a financial account associated with the QR code (which may, for example, pertain to a particular cause, foundation, non-profit organization, or political candidate).

The payment system/platform disclosed herein may also be used in more traditional point of sale contexts. For example, a user may use mobile device 110 to scan a QR code displayed on or proximate to a particular product, and to transfer funds to the merchant who has presented that product for sale. This same format could also be used at self-checkout kiosks or when shopping online, so long as the online platform provides a QR code which the user can scan to transfer funds via his or her mobile device. In response, the online platform may automatically provide a visual indication that the purchase has been completed, once he or she has completed the transaction on the mobile device.

The payment system/platform disclosed herein may also be used for transacting business with or making payments to a city, state, or municipality (e.g., for purchasing parking, paying tickets or fines, or purchasing other services).

As explained above, the present invention provides a number of distinct advantages over existing payment systems. Instead of allowing the merchant or the recipient of the funds access to personal or financial account information of the purchaser, it is the merchant/recipient whose QR code is scanned. Instead of the merchant/recipient processing the transaction, a third-party server/database (e.g., database 302 from FIG. 2) is used.

What is claimed is:

1. A first server including a non-transitory computer-readable medium storing therein a program causing the first server to execute processing comprising:
    receiving, at the first server, a first encrypted message, wherein the first encrypted message is generated based on image data that is decoded to retrieve a code;
    decrypting the first encrypted message to retrieve an account ID, information associated with a user of a first mobile device, and information specifying a quantity of funds, wherein the information associated with the user of a mobile device includes a customer ID and does not identify a financial account of the user;
    storing at the first server:
        a plurality of account IDs, wherein each one of the plurality of account IDs is associated with a financial account,
        the retrieved account ID, wherein the retrieved account ID is associated with a financial account of a recipient entity and is derived from a code associated with the recipient entity,
        information associated with the user of the first mobile device, and the quantity of funds, wherein the quantity of funds is specified for transfer to the recipient entity;
    verifying, at the first server, the retrieved account ID by comparing the retrieved account ID with the stored plurality of account IDs to identify a match, wherein the retrieved account ID identifies a financial account of the recipient entity into which a quantity of funds specified by the user may be deposited;
    generating a second message, after verifying the retrieved account ID, the second message including the information associated with the user of the first mobile device and the quantity of funds specified for transfer, wherein the information associated with the user of the first mobile device contained in the second message does not identify a financial account associated with the user;
    encrypting the second message to obtain a second encrypted message, wherein information included in the second message is used to update a first database associated with the user and a second database associated with the recipient entity; and
    transmitting the second encrypted message to a second server for executing a payment processing transaction, the payment processing transaction comprising transfer of the specified quantity of funds from a financial account of the user of the first mobile device to the recipient entity.

2. The first server of claim 1, wherein the processing further comprises receiving, at the first server, a transaction ID generated and transmitted by the second server following execution of the payment processing transaction, wherein the transaction ID identifies the payment processing transaction and is usable for reversing the payment processing transaction or requesting a refund.

3. A system comprising:
a server; and
a mobile device including:
   a display;
   a memory for storing:
      information associated with a user of the mobile device, said information comprising a customer ID,
      a code associated with financial information of a recipient entity, and
      an account ID associated with a financial account of the recipient entity, wherein the account ID is derived from the code and identifies a financial account of the recipient entity into which a quantity of funds specified by the user may be deposited;
   a camera including an image sensor for capturing image data, wherein the image data includes information corresponding to the code;
   a processor configured to:
      receive the image data after the camera captures the image data;
      process the image data to detect whether the image data includes the information corresponding to the code;
      obtain the code when the processor detects that the image data includes the information corresponding to the code;
      derive the account ID from the code; and
      generate a prompt, wherein the prompt is displayed on the display for specifying a quantity of funds for transfer to the recipient entity;
   an input device receiving a user input in response to the prompt, wherein
the processor is further configured to:
   generate a message when the user input is received; and
   encrypt the message, the encrypted message including information used to update a first database associated with the user and a second database associated with the recipient entity, wherein the encrypted message is generated based on the image data captured by the camera;
a transmitter operable to transmit the encrypted message, wherein the transmitting comprises transmitting the derived account ID, specified quantity of funds, and information associated with the user of the mobile device, wherein the transmitted information associated with the user of the mobile device does not identify a financial account associated with the user,
wherein the server includes a non-transitory computer-readable medium storing therein a program causing the server to execute processing comprising:
   receiving the encrypted message from the mobile device;
   decrypting the encrypted message to retrieve the account ID, information associated with the user of the mobile device, and information specifying the quantity of funds, wherein the information associated with the user of the mobile device includes the customer ID;
   storing at the first server:
      a plurality of account IDs, wherein each one of the plurality of account IDs is associated with a financial account,
      the retrieved account ID, wherein the retrieved account ID is associated with a financial account of the recipient entity and is derived from a code associated with the recipient entity,
      information associated with the user of the mobile device, and
      the quantity of funds, wherein the quantity of funds is specified for transfer to the recipient entity;
   verifying the retrieved account ID by comparing the retrieved account ID with the stored plurality of account IDs to identify a match, wherein the retrieved account ID identifies a financial account of the recipient entity into which a quantity of funds specified by the user may be deposited;
   generating a second message, after verifying the retrieved account ID, the second message including the information associated with the user of the mobile device and the quantity of funds specified for transfer, wherein the information associated with the user of the mobile device contained in the second message does not identify a financial account associated with the user;
   encrypting the second message to obtain a second encrypted message, wherein information included in the second message is used to update a first database associated with the user and a second database associated with the recipient entity; and
   transmitting the second encrypted message.

4. The system of claim 3, wherein the second encrypted message is transmitted to an additional server for executing a payment processing transaction, the payment processing transaction comprising transfer of the specified quantity of funds from a financial account of the user of the mobile device to the recipient entity.

5. A mobile device comprising:
a display;
a memory for storing:
   information associated with a user of the mobile device, said information comprising a customer ID,
   a code associated with financial information of a recipient entity, and
   an account ID associated with a financial account of the recipient entity, wherein the account ID is derived from the code and identifies a financial account of the recipient entity into which a quantity of funds specified by the user may be deposited;
a camera including an image sensor for capturing image data, wherein the image data includes information corresponding to the code;
a processor configured to:
   receive the image data after the camera captures the image data;
   process the image data to detect whether the image data includes the information corresponding to the code;
   obtain the code when the processor detects that the image data includes the information corresponding to the code;
   derive the account ID from the code; and
   generate a prompt, wherein the prompt is displayed on the display for specifying a quantity of funds for transfer to the recipient entity;

an input device receiving a user input in response to the prompt, wherein the processor is further configured to:
generate a message when the user input is received; and
encrypt the message, the encrypted message including information used to update a first database associated with the user and a second database associated with the recipient entity, wherein the encrypted message is generated based on the image data captured by the camera;
a transmitter operable to transmit the encrypted message, wherein the transmitting comprises transmitting the derived account ID, specified quantity of funds, and information associated with the user of the mobile device to a first server for verifying the derived account ID by comparing the derived account ID with a plurality of account IDs to identify a match, wherein the transmitted information associated with the user of the mobile device does not identify a financial account associated with the user.

6. The mobile device of claim 5, wherein the code is a QR code, and the input device is a touchscreen.

7. The mobile device of claim 6, wherein the processor is configured to display a guide to facilitate capture of the image data, the image data corresponding to a decodable image of the QR code.

8. The mobile device of claim 5, further comprising a receiver for receiving an electronic transmission of the code.

9. The mobile device of claim 5, wherein the processor is configured to generate a prompt for specifying a quantity of digital currency for transfer to the recipient entity.

10. The mobile device of claim 5, further comprising a GPS receiver configured to provide a location corresponding to an entity to whom a user can provide payment using the mobile device, wherein the display displays the location of the entity on a map.

11. A payment processing method comprising:
storing in a memory of a first mobile device information associated with a user of the first mobile device, said information comprising a customer ID;
receiving at the mobile device a code associated with a financial account of a recipient entity;
storing the code in the memory;
deriving from the code an account ID associated with the financial account, wherein the account ID identifies a financial account of the recipient entity into which a quantity of funds specified by the user may be deposited;
storing the account ID in the memory;
displaying a prompt on the first mobile device for specifying a quantity of funds for transfer to the recipient entity;
receiving a user input in response to the prompt;
generating a message when the user input is received, the message including the account ID;
encrypting the message, the encrypted message including information used to update a first database associated with the user and a second database associated with the recipient entity;
verifying the derived account ID, by transmitting the encrypted message containing the derived account ID, specified quantity of funds, and information associated with the user of the mobile device, to a first server, wherein the verifying comprises validating the derived account ID by comparing the derived account ID with a plurality of account IDs to identify a match, wherein the transmitted information associated with the user of the mobile device does not identify a financial account associated with the user;
transmitting the information associated with the user of the mobile device and specified quantity of funds to a second server for executing a payment processing transaction, the payment processing transaction comprising transfer of the specified quantity of funds from the user of the mobile device to the recipient;
identifying and displaying the location of a plurality of candidate recipient entities within a payment processing network, wherein the user of the first mobile device is a member of the payment processing network.

12. The method of claim 11, wherein the code comprises a QR code, and further comprising capturing an image of the QR code from a second mobile device, using a camera comprising an image sensor of the first mobile device.

13. The method of claim 12, further comprising displaying a guide for capturing the QR code using the camera of the first mobile device.

14. The method of claim 11, wherein the code is transmitted to the first mobile device by a second mobile device.

15. The method of claim 11, wherein the code is embedded within a physical object.

16. The method of claim 11, wherein the recipient entity is a member of a payment processing network, and a user of the first mobile device is a member of the payment processing network.

17. The method of claim 11, wherein the displaying a prompt comprises requesting the user to specify a quantity of digital currency.

18. The method of claim 11, wherein the customer ID is associated with a financial account of the user of the first mobile device.

19. The method of claim 11, wherein the payment processing transaction comprises a donation.

20. The method of claim 11, wherein the prompt includes one or more selectable predetermined quantity options.

21. The method of claim 11, wherein the prompt includes a text field for entering a quantity of funds.

* * * * *